(12) United States Patent
Huang

(10) Patent No.: US 6,574,870 B1
(45) Date of Patent: Jun. 10, 2003

(54) METAL SHEARS WITH AN ATTACHED TAG

(76) Inventor: Hsin-Te Huang, No. 11, 35 Rd., Ind. Dist., Taichung (TW)

(*) Notice: Subject to any disclaimer, the term of this patent is extended or adjusted under 35 U.S.C. 154(b) by 0 days.

(21) Appl. No.: 10/003,402

(22) Filed: Dec. 6, 2001

(51) Int. Cl.[7] .............................................. B26B 13/16
(52) U.S. Cl. ......................................... 30/252; 30/262
(58) Field of Search ........................ 30/261, 262, 193, 30/252, 254

(56) References Cited

U.S. PATENT DOCUMENTS

| | | | | |
|---|---|---|---|---|
| 2,504,766 A | * | 4/1950 | Vosbikian | 30/262 |
| 2,655,722 A | * | 10/1953 | Klenk | 30/252 |
| 4,258,472 A | * | 3/1981 | Wallace et al. | 30/262 |
| 4,439,923 A | * | 4/1984 | Scranton | 30/252 |
| 5,699,617 A | * | 12/1997 | Mock | 30/252 |

* cited by examiner

*Primary Examiner*—Hwei-Siu Payer
(74) *Attorney, Agent, or Firm*—Fei-Fei Chao; Venable, Baetjer, Howard & Civiletti, LLP

(57) ABSTRACT

A pair of metal shears has two blades, two handles, a tag and a locking lever. The blades are pivotally connected to each other with a first pivot pin. The handles are pivotally connected to each other with a second pivot pin. Each handle is pivotally connected to one of the blade with a third pivot pin. The tag is attached to one of the handles to show information of the pair of metal shears. The locking lever is pivotally attached to one of the handles to engage with the other handle. With such an attached tag, the information or instructions about the metal shears can be clearly shown on the tag.

4 Claims, 10 Drawing Sheets

METAL SHEARS WITH AN ATTACHED TAG

BACKGROUND OF THE INVENTION

1. Field of the Invention

The present invention relates to a pair of metal shears, and more particularly to metal shears with an attached tag to clearly show the information about the shears.

2. Description of Related Art

With reference to FIG. 10, a pair of conventional metal shears in accordance with the prior art comprises two blades (30, 32) and two handles (34, 36). The blades (30, 32) are pivotally connected to each other with a first pivot pin (31). The handles (34, 36) are pivotally connected to each other with a second pivot pin (35). Each handle (34, 36) is pivotally attached to a respective one of the blades (30, 32) with a third pivot pin (37). A spring (not shown) is mounted between the handles (34, 36) to provide a biasing force to push the handles (34, 36) apart. To avoid a user, especially a child, being cut by the blades (30, 32) when holding or playing with the metal shears, a locking lever (38) is pivotally attached to one handle (36) and engages with the third pivot pin (37) on the other handle (34).

However, because the conventional metal shears are made of metal, it is very difficult to mark information or instructions about the shears onto the metal shears. Even if there could be some information or instructions marked on the handles (34, 36) of the conventional metal shears by means of punching processes, the punched marks on the conventional shears will be very unclear. The marks on the conventional metal shears cannot clearly show the information to the buyer or the user. In addition, the handles (34, 36) of the conventional metal shears are usually painted black. The mark on the conventional metal shears will be further unclear due to the black color of the handle (34, 36), especially when the conventional metal shears are packed in a transparent package cover. Despite the cover being substantially transparent, it is found that distortions occur in what is being viewed because the cover is made of pliable plastic.

Furthermore, the user must rotate by hand the conventional locking lever (38) and so to release the locking lever (38) from the third pivot pin (37) is inconvenient.

To overcome the shortcomings, the present invention provides a pair of metal shears to mitigate or obviate the aforementioned problems.

SUMMARY OF THE INVENTION

The main objective of the invention is to provide a pair of metal shears with an attached tag that can clearly show the information or instruction about the metal shears. The pair of metal shears has two blades, two handles, a tag and a locking lever. The blades are pivotally connected to each other with a first pivot pin. The handles are pivotally connected to each other with a second pivot pin. Each handle is pivotally connected to a respective one of the blades with a third pivot pin. The tag is attached to one of the handles to show information of the pair of metal shears. The locking lever is pivotally attached to one of the handles to engage with the other handle so as to keep the two handles closed when required. Because the tag can be made of a material that can be easily painted or printed on, the information or instructions on the tag can be clearly shown to a buyer or a user even if the pair of metal shears is packed in a transparent package cover.

Other objects, advantages and novel features of the invention will become more apparent from the following detailed description when taken in conjunction with the accompanying drawings.

DETAILED DESCRIPTION OF PREFERRED EMBODIMENT

Figure 1:
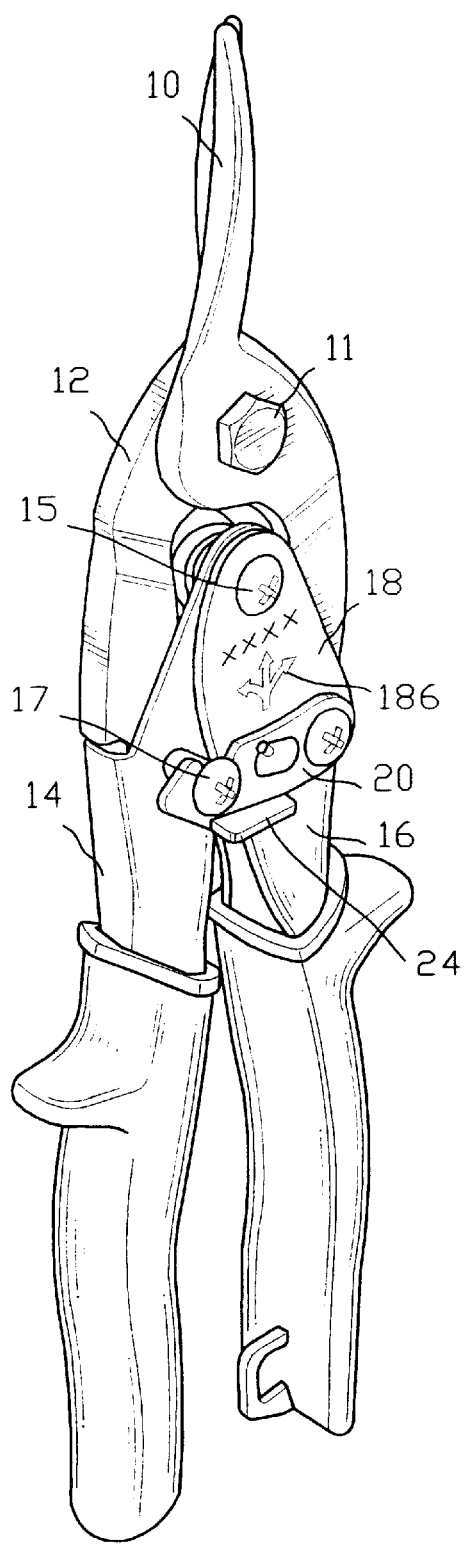
FIG. 1 is a perspective view of a pair of metal shears in accordance with the present invention.
Figure 2:
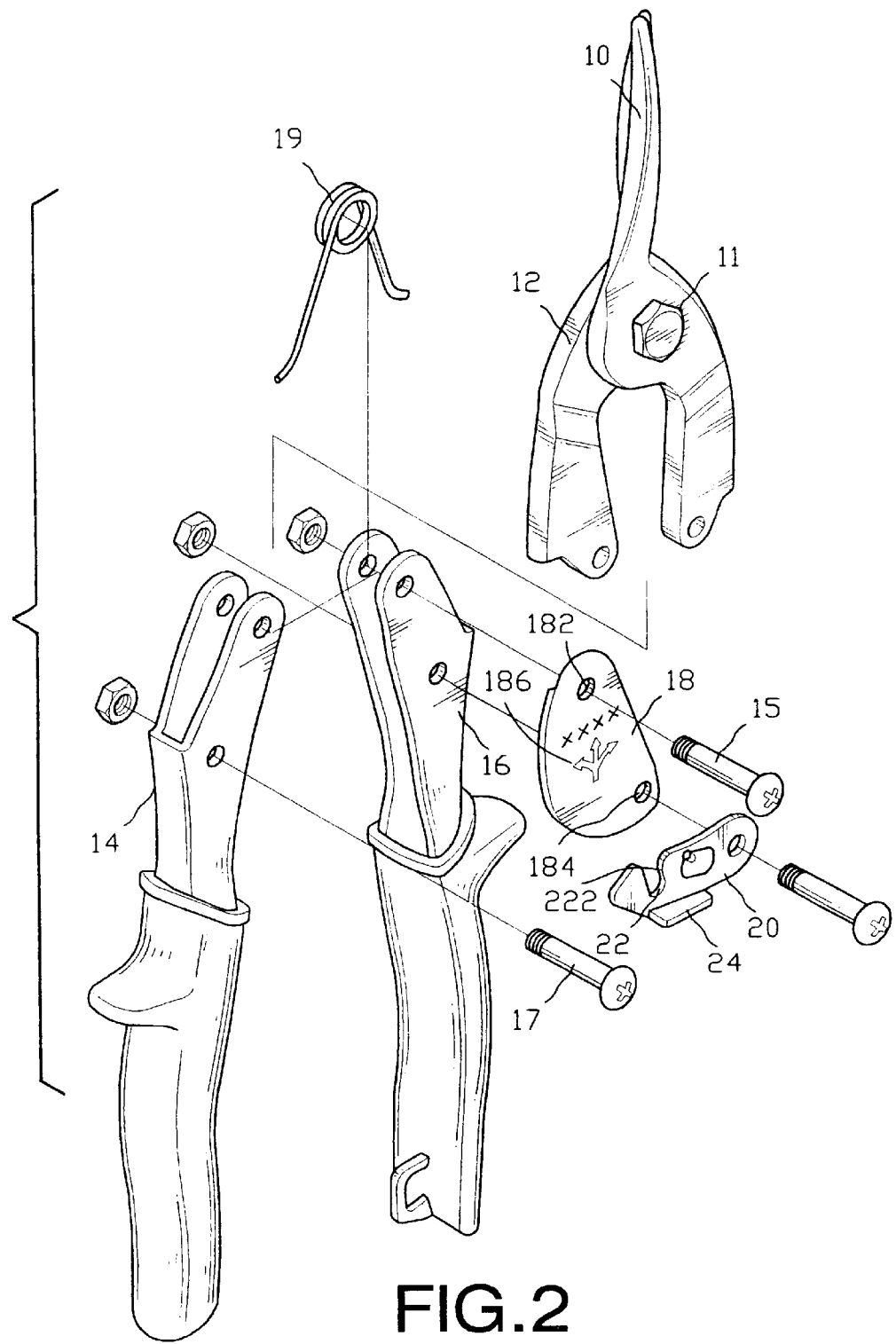
FIG. 2 is an exploded perspective view of the pair of metal shears in FIG. 1.

With reference to FIGS. 1 and 2, a pair of metal shears in accordance with the present invention comprises two blades (10, 12), two handles (14, 16) and a tag (18). The blades (10, 12) are pivotally attached to each other with a first pivot pin (11). The handles (14, 16) are pivotally attached to each other with a second pivot pin (15). Each blade (10, 12) is pivotally attached to a respective one of the handles (14, 16) with a third pivot pin (17). A spring (19) is mounted between the two handles (14, 16) to provide a biasing force to push the handles (14, 16) away from each other.

Figure 3:
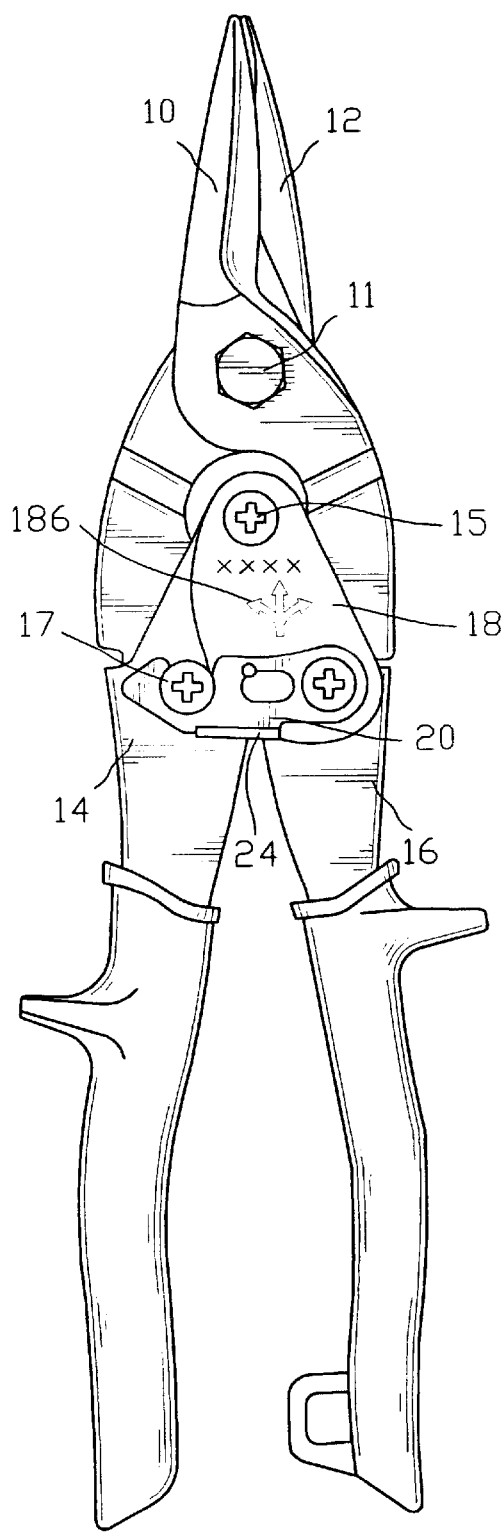
FIG. 3 is a side plan view of the pair of metal shears in FIG. 1 with the tag showing one type of the pair of metal shears.
Figure 4:
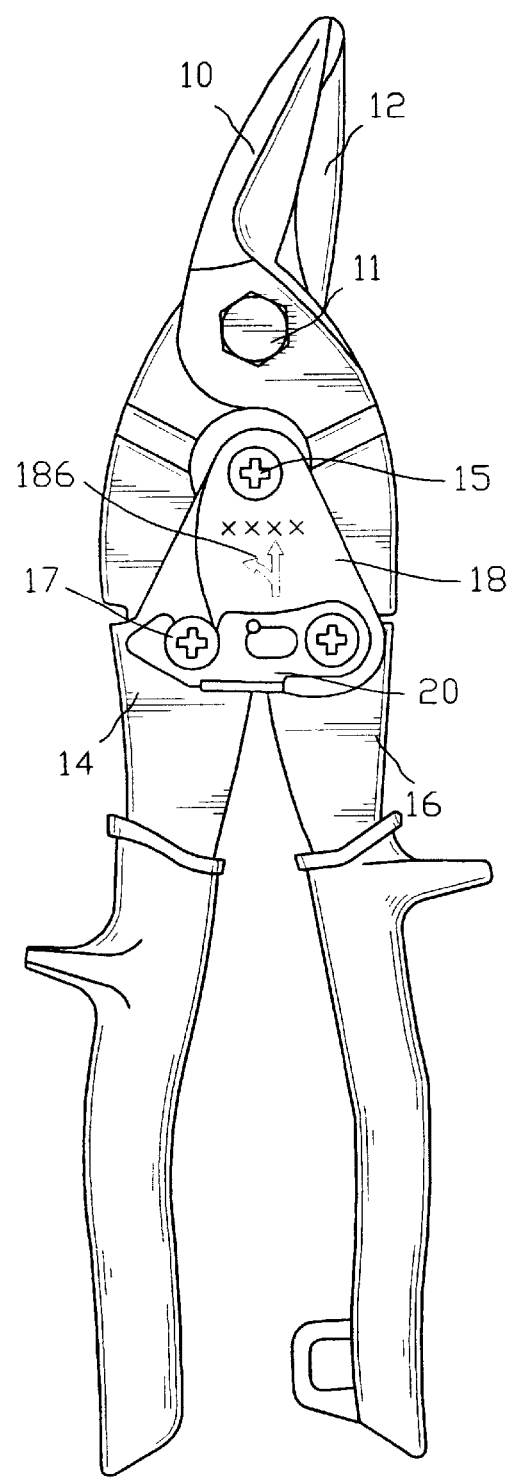
FIG. 4 is a side plan view of the pair of metal shears in FIG. 1 with the tag showing another type of the pair of metal shears.
Figure 5:
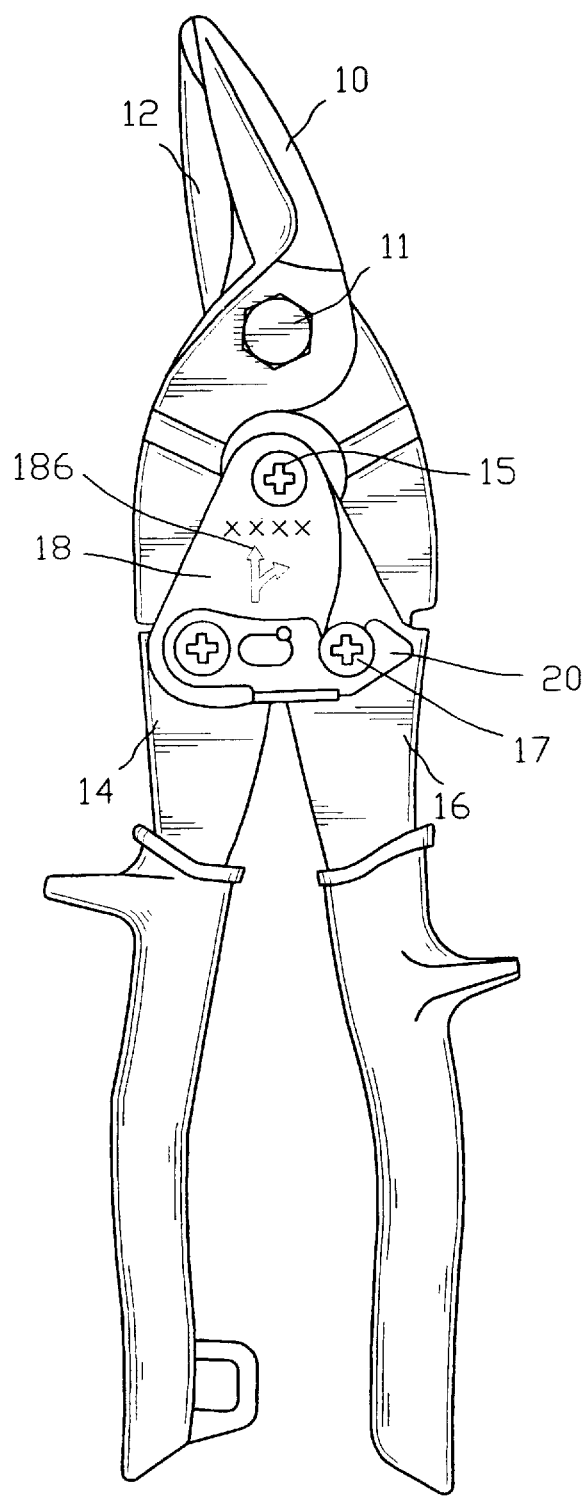
FIG. 5 is a side plan view of the pair of metal shears in FIG. 1 with the tag showing a third type of the pair of metal shears.

The tag (18) is securely attached to one of the handles (14, 16). In practice, the tag (18) is made of a plastic material. Two bores (182, 184) are defined in the tag (18) respectively for the second pivot pin (15) and one of the third pivot pins (17) to extend through the bores (182, 184). Some information or instructions are printed on the tag (18) to show the features of the pair of metal shears. For example, the tag can show the trademark, the type or the model of the pair of metal shears as shown in FIGS. 3 to 5. In addition, the tag (18) also shows a symbol (186), wherein the symbol (186) can be the cutting direction of the blades (10, 12) and so on. According to the symbol (186), if the user wants to buy or use a pair of metal shears that can cut the metal sheet in a straight direction and in a left-turning curve direction, the user can choose the pair of metal shears with a tag (18) having a symbol (186) as shown in FIG. 4.

Figure 6:
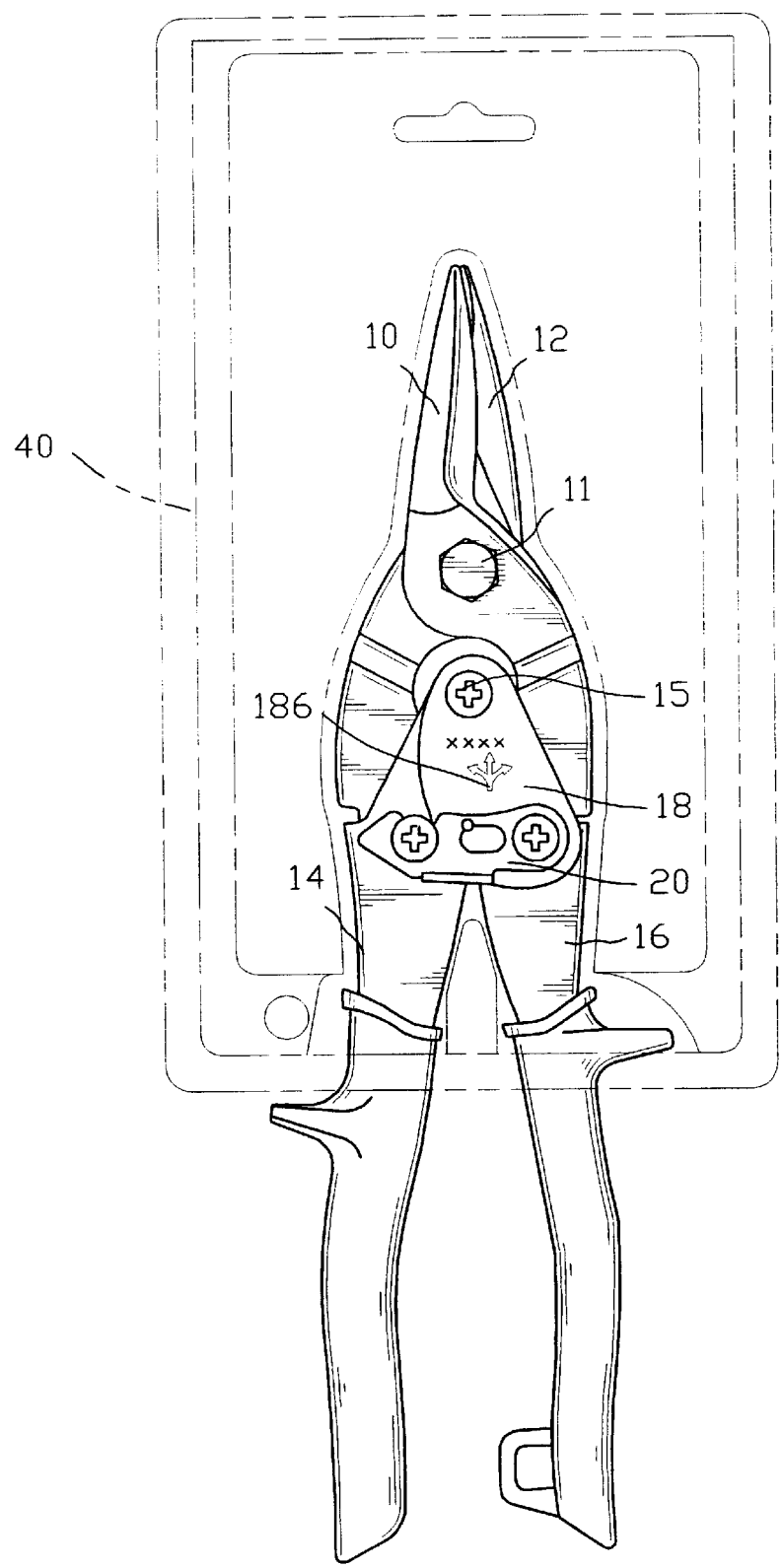
FIG. 6 is a side plan view of the pair of metal shears in FIG. 1 and the tag being packed in a transparent package cover.

With such a tag (18), the information or instructions of the pair of metal shears can be clearly shown to a buyer or a user even if the pair of metal shears is packed in a transparent package cover (40) as shown in FIG. 6. The tag (18) can be also made or painted in contrasting colors to clearly show the information or instructions of the pair of metal shears when the handles (14, 16) are painted black. The buyer or the user can easily buy and choose the particular metal shears needed from the store shelf by viewing the information, instructions or the symbol (186) on the tag (18).

Figure 7:
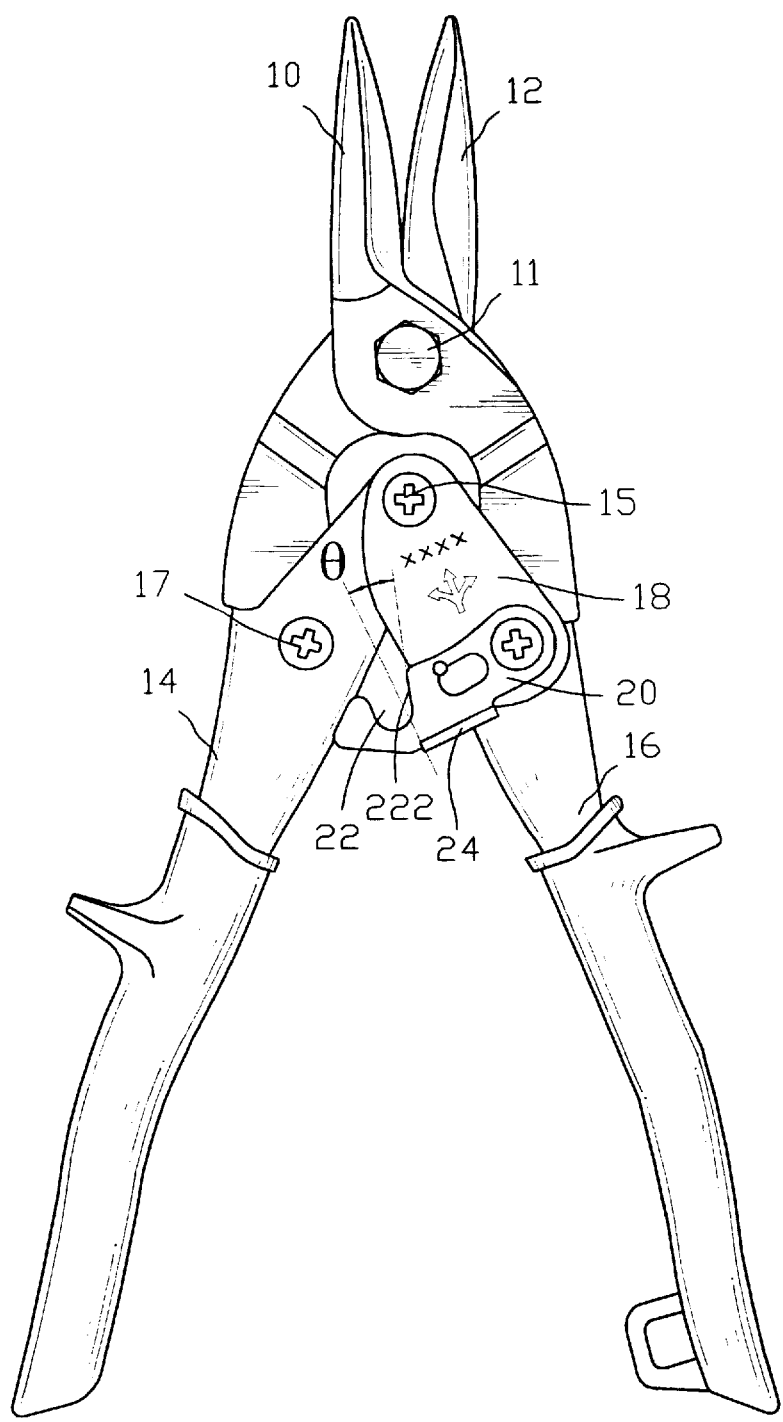
FIG. 7 is an operational side plan view of the pair of metal shears in FIG. 1 with the locking lever being released and the blades opened.
Figure 8:
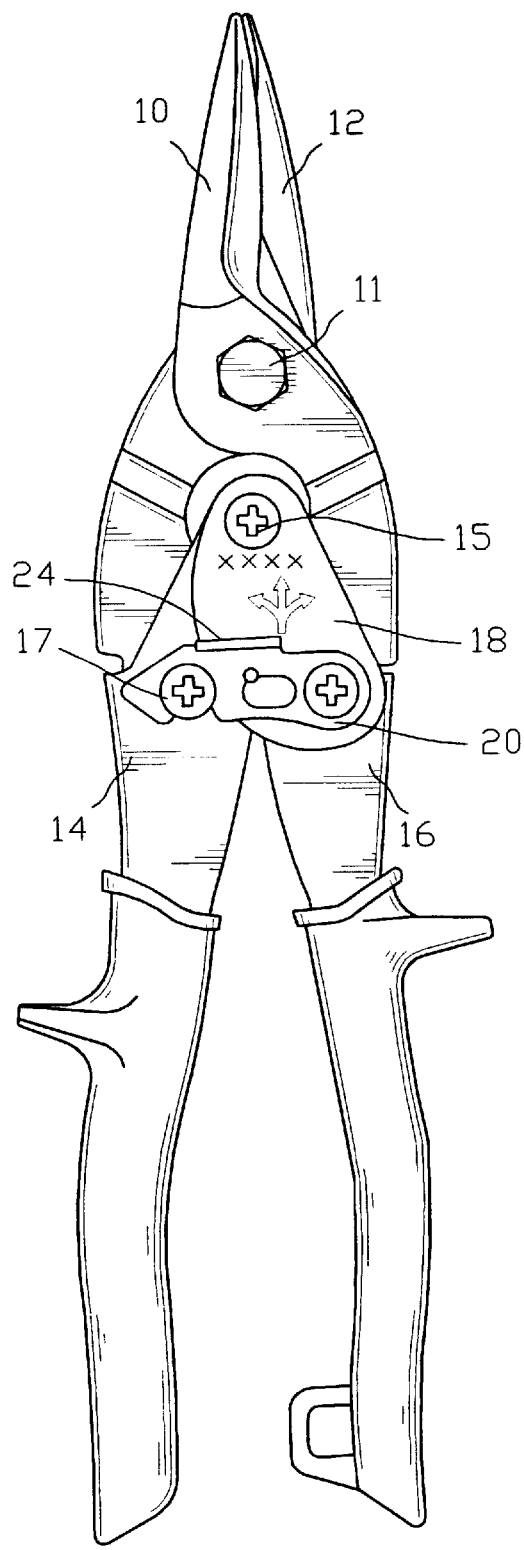
FIG. 8 is a side plan view of the pair of metal shears in accordance with the present invention with a locking lever having a notch defined in the bottom edge of the locking lever.

With reference to FIGS. 3, 7 and 8, a locking lever (20) is pivotally attached to one of the handles, in this case the handle (16). As shown in FIG. 2, a locking notch (22) is defined in the locking lever (20) to engage the third pivot pin (17) in the other handle (14). Consequently, the handles (14, 16) can be kept in a closed condition by means of the engagement between the third pivot pin (17) and the locking notch (22) in the locking lever (20). This can provide good safety to a person, even when holding the metal shears in play. The metal shears are operated after releasing the locking lever (20) from the third pivot pin (17).

Figure 9:
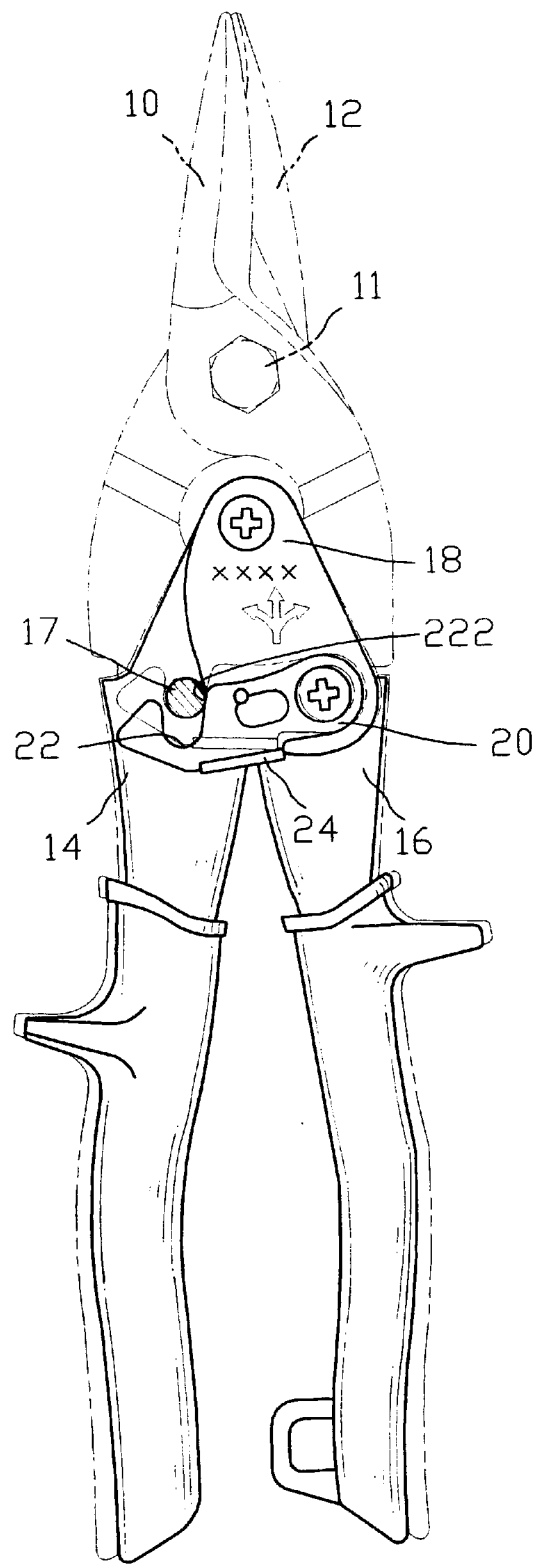
FIG. 9 is an operational side plan view of the metal shears in FIG. 1 showing that the locking lever automatically releases from the third pivot pin as the handle is squeezed.
Figure 10:
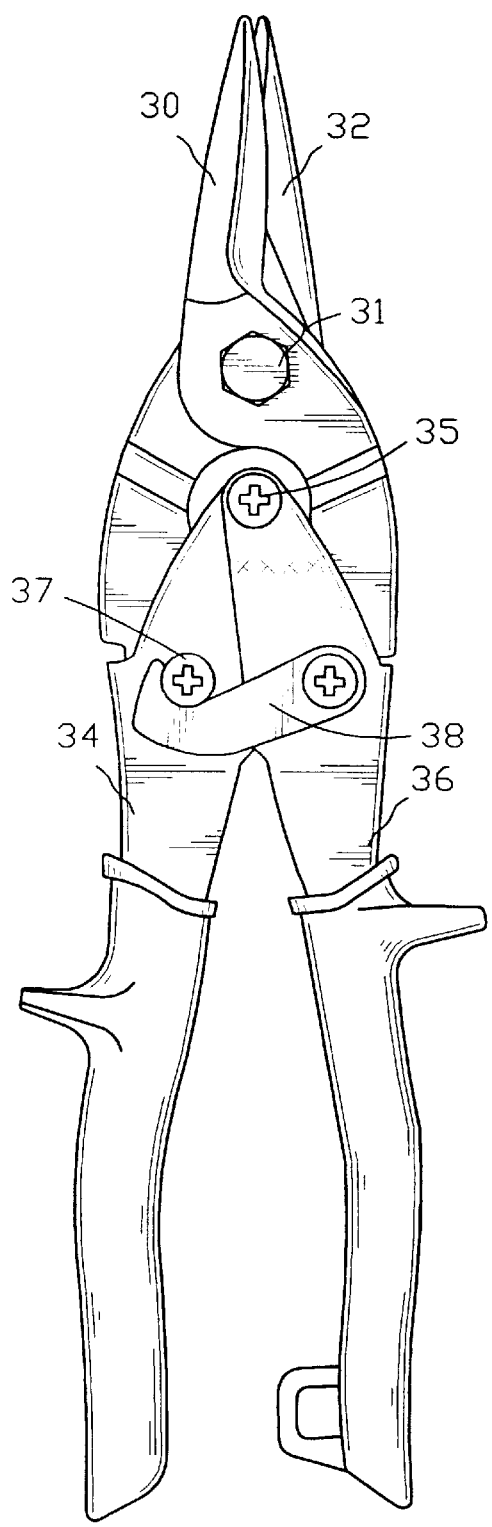
FIG. 10 is a side plan view of a conventional pair of metal shears in accordance with the prior art.

In practice, the locking notch (22) is defined in the bottom edge of the locking lever (20) so that the locking lever (20) engages with the third pivot pin (17) from a downward direction as shown in FIG. 8. In another embodiment, the locking notch (22) is defined in the top edge of the locking lever (20) so that the locking lever engages with the third pivot pin (17) from an upward direction as shown in FIGS. 3 and 7. A tab (24) is perpendicularly formed on the locking lever (20) for the user to easily rotate the locking lever (20). In addition, with reference to FIGS. 2, 7 and 9, an inclined edge (222) is formed on the inner surface of the locking notch (22) at the side apart from the free end of the locking lever (20). Preferably, the inclined edge (222) has an angle θ ranged from 15° to 18° relative to a line vertical to the edge of the locking lever (20) defining the locking notch (22) as shown in the phantom lines in FIG. 7. Accordingly, when the user squeezes the two handles (14, 16) together, the handles (14, 16) will be forced to move closer to each other. The respective third pivot pin (17) will push against the inclined edge (222) in the locking notch (22). The locking lever (20) will be pushed to rotate relative to the handle (16) and will automatically release from the third pivot pin (17). Consequently, to release the locking lever (20) from the third pivot pin (17) is very easy and convenient.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A pair of metal shears comprising:
    two blades pivotally connected to each other with a first pivot pin;
    two handles pivotally connected to each other with a second pivot pin, and each handle pivotally connected by a respective one of two third pivot pins to a respective one of the blades;
    a tag attached to one of the handles to show information of the pair of metal shears; and
    a locking lever pivotally attached to one of the handles and having a locking notch defined in an edge of the locking lever to engage with the other handle so as to keep the two handles closed when required,
    wherein the locking notch has an inclined edge formed on an inner surface at a side of the notch apart from a free end of the locking lever; and
    the inclined edge has an angle ranged from 15° to 18° relative to a line vertical to the edge of the locking lever defining the notch,
    wherein the tag has a first bore for the second pivot pin extending through the first bore and a second bore for the third pivot pin in the handle on which the tag is attached extending through the second bore.

2. The pair of metal shears as claimed in claim 1 further comprising a spring mounted between the two handles to provide a biasing force to push the handles away from each other.

3. The pair of metal shears as claimed in claim 1, wherein the locking notch is defined in a top edge of the locking lever to engage with the third pivot pin in the other handle.

4. The pair of metal shears as claimed in claim 1, wherein the locking notch is defined in a bottom edge of the locking lever to engage with the third pivot pin on the other handle.

* * * * *